United States Patent [19]

Yano et al.

[11] Patent Number: 4,473,274
[45] Date of Patent: Sep. 25, 1984

[54] OBJECTIVE LENS ASSEMBLY FOR OPTICAL DISC PLAYER

[75] Inventors: Hajime Yano; Katsuaki Tsurushima, both of Tokyo, Japan

[73] Assignee: Sony Corporation, Tokyo, Japan

[21] Appl. No.: 388,719

[22] Filed: Jun. 15, 1982

[30] Foreign Application Priority Data

Jun. 22, 1982 [JP] Japan .................. 56-96248

[51] Int. Cl.³ ............................ G02B 07/04
[52] U.S. Cl. ........................ 350/255; 350/6.3
[58] Field of Search ............ 350/6.6, 247, 255

[56] References Cited

U.S. PATENT DOCUMENTS

| 3,432,218 | 3/1969 | Loughridge et al. | 350/247 |
| 4,372,640 | 2/1983 | LaCroix | 350/6.3 |
| 4,386,823 | 6/1983 | Musha | 350/247 |

OTHER PUBLICATIONS

Application Serial No. 336,551, Tsurashima & Shintani, Jan. 1982.

*Primary Examiner*—John K. Corbin
*Assistant Examiner*—Lynn Vandenburgh
*Attorney, Agent, or Firm*—Lewis H. Eslinger; Alvin Sinderbrand

[57] ABSTRACT

In an optical disc player or other apparatus in which a light beam is directed through an objective lens to be focused thereby at a record medium surface for optically reading information recorded in a track on such surface; the objective lens is mounted eccentrically in a circular end wall of a body member having a cylindrical side wall depending from the periphery of the end wall, a bearing sleeve extends axially from the center of the end wall and is slidable on a shaft extending upwardly from a base member so that the body member is both angularly displaceable about the shaft axis and axially displaceable relative to the base member to correct for tracking and focusing errors, respectively, inner and outer yokes extend upwardly from the base member at the inside and outside, respectively, of the cylindrical side wall and have respective radially aligned gaps, a magnet is associated with the yokes for generating magnetic flux through the side wall of the body member between the inner and outer yokes, and tracking and focusing coils are provided on the cylindrical side wall of the body member, with the tracking coils being shaped to have first and second portions extending parallel to the shaft axis and through which current will flow in opposed directions in response to the supplying of a tracking error signal to the tracking coils, with each first tracking coil portion being located between the inner and outer yokes to interact with the magnetic flux and thereby effect angular or rotary displacement of the body member in response to tracking error signals and each second tracking coil portion being located proximate to gaps of said inner and outer yokes so as to be substantially free of the magnetic flux, and with the path of a light beam through the objective lens being arranged to pass through a gap of the inner yoke and between the bearing sleeve and the cylindrical side wall of the body member.

13 Claims, 7 Drawing Figures

FIG. 7

OBJECTIVE LENS ASSEMBLY FOR OPTICAL DISC PLAYER

BACKGROUND OF THE INVENTION

1. Field of the Invention

This invention relates generally to an objective lens assembly particularly suited for use in an optical disc player in which a light beam is directed against a disc or other record medium surface for optically reading information recorded in a track on such surface.

2. Description of the Prior Art

It has been proposed, for example, in U.S. patent application Ser. No. 06/336,551, filed Jan. 4, 1982, and having a common assignee herewith, to provide an objective lens assembly for an optical disc player in which an objective lens is eccentrically mounted in an annular lens mount from which a cylindrical body depends, and the cylindrical body is slidable within a cylindrical bearing for both axial and rotary movements relative to the latter. The cylindrical bearing is secured within an inner cylindrical yoke to which an outer cylindrical yoke is connected, at the bottom, by an annular yoke connection, and an annular magnet is interposed in the outer yoke to complete a magnetic circuit in which magnetic flux extends across an upwardly opening annular space or gap defined between the inner and outer yokes. The outer annular yoke has a pair of diametrically opposed cutouts therein so that the magnetic flux or field between the inner and outer yokes will be very substantially reduced in the regions of such cutouts. A flange extends radially outward from the periphery of the lens mount, and a cylindrical bobbin depends axially from the outer periphery of such flange into the annular gap between the inner and outer yokes. A focusing coil is wound circumferentially around the outer surface of the cylindrical bobbin so that a driving current flowing in the focusing coil can coact with the magnetic flux extending across the gap for causing axial displacement of the objective lens parallel to the central axis of the cylindrical body and bearing. Also mounted on the cylindrical bobbin are substantially rectangular tracking coils having first and second portions extending substantially parallel to the axis of the cylindrical body and bearing and through which a driving current supplied to the tracking coils will flow in opposed directions, with the first portions of the tracking coils being located between the inner and outer yokes for interacting with the magnetic flux and thereby effecting desired rotary movements in response to the driving current, while the second portions of the tracking coils are located proximate to the cutouts in the outer yoke for reducing the electromagnetically induced force tending to oppose such desired rotary movements.

When the above-described lens assembly is in use, a light beam, in passing through the objective lens, extends longitudinally through the cylindrical body and a focusing error signal may be applied to the focusing coil for effecting axial movements of the cylindrical body within the bearing to cause corresponding movements of the objective lens for correcting focusing errors. Further, in response to a tracking error signal applied to the tracking coils, the resulting driving current flowing through the tracking coils interacts with the magnetic flux for turning the cylindrical body relative to the bearing, and the eccentricity of the objective lens relative to the cylindrical body may be in a direction to cause displacement of the optical axis of the objective lens in the radial direction of the record disc being scanned for correcting a tracking error.

However, it has been found that the abovedescribed objective lens assembly has less sensitivity than may be desired, particularly in respect to the correction of tracking errors, and that the arrangement of such lens assembly inherently limits the increases in such sensitivity that may be achieved therewith. The sensitivity of the assembly for correcting tracking errors can be increased by: (1) Increasing the eccentricity of the objective lens, that is, the radial distance between the optical axis of such lens and the axis about which the lens mount is turned for correcting tracking errors; (2) Reducing the frictional resistance to turning of the objective lens mount; (3) Increasing the driving torque of the rotating motor constituted by the tracking coils and the magnetic circuit; and (4) Reducing the weight of the structure supporting the objective lens and movable therewith for correcting tracking errors. However, in the case of the previously proposed objective lens assembly described above, since the path of the light beam through the objective lens extends axially within the cylindrical body which is rotatable within the cylindrical bearing, any increase in the eccentricity of the objective lens relative to the axis of rotary movement requires a corresponding increase in the diameters of the cylindrical body and bearing, as a result of which there is a corresponding increase in the frictional resistance to the rotary movements for correcting tracking errors and also an increase in the weight of the supporting structure movable with the objective lens. Such increases in frictional resistance to the rotary movements and in the weight of the structure that needs to be moved more than overcome the advantageous increase in eccentricity and any increase in the driving torque of the rotating motor achieved by increasing the diameter of the bobbin on which the tracking coils are mounted. Therefore, substantial improvements in the sensitivity of the lens assembly for correcting tracking errors are not to be expected from increasing the eccentricity of the lens.

Furthermore, since the cylindrical bearing which guides the cylindrical body supporting the lens mount is secured to the inner surface of the inner yoke, a leakage flux is generated toward the cylindrical body and bearing from the flanks of the outer yoke defining the cutouts in the latter. Such leakage flux reduces the density of the remaining magnetic flux available to coact with the first portions of the tracking coils for causing the desired rotary movements to correct a tracking error. Moreover, the leakage flux will undesirably coact with the second portions of the tracking coils situated proximate to cutouts for decreasing the driving torque in the desired direction.

OBJECTS AND SUMMARY OF THE INVENTION

Accordingly, it is an object of this invention to provide an improved objective lens assembly which avoids the foregoing disadvantages of the above-described previously proposed arrangement.

More specifically, it is an object of this invention to provide an objective lens assembly for an optical disc player which affords increased sensitivity for correcting tracking errors.

Another object of this invention is to provide an objective lens assembly for an optical disc player, as aforesaid, in which relatively large displacements of the mounted objective lens in the directions for correcting tracking errors may be realized while avoiding increased frictional resistance to such movements or displacements.

Still another object of this invention is to provide an objective lens assembly for an optical disc player, as aforesaid, in which the yokes included in the magnetic circuit are arranged in respect to tracking coils so as to avoid reduction of the torque available for effecting tracking error corrections by reason of leakage flux undesirably coacting with the tracking coils.

In accordance with an aspect of this invention, a lens assembly comprises a body member having a substantially circular end wall and a cylindrical side wall depending from the periphery of such end wall; support means including a base member under the body member and cooperatively engageable bearing members extending from the end wall and from the base member, respectively, substantially close to the central axis of the cylindrical side wall and being relatively movable to permit at least rotary movements of the body member relative to the base member about the central axis; a lens, for example, the objective lens in an optical disc player, mounted eccentrically in the end wall radially between the side wall and the bearing members with an optical axis of the lens extending parallel with the central axis; inner and outer yoke means extending upwardly from the base member at the inside and outside, respectively, of the cylindrical side wall with radial clearance therebetween, at least the outer yoke means having a gap or gaps therein; magnet means associated with said yoke means for generating magnetic flux through the cylindrical side wall of the body member between the inner and outer yoke means; coil means on the cylindrical side wall of the body member and shaped to have first and second portions extending substantially parallel to the central axis and through which a driving current supplied to said coil means will flow in opposed directions, each of the first portions of the coil means being located between the inner and outer yoke means for interacting with the magnetic flux and thereby effecting rotary movements in response to the driving current, for example, to correct tracking errors, and each of the second portions of the coil means being located proximate to a gap of the yoke means to be substantially free of the magnetic flux; and means defining a path through the inner yoke means for a light beam directed substantially along the optical axis of the lens and passing between the bearing members and the cylindrical side wall so that an increase in the eccentricity of the lens relative to the central axis does not require an increase in the diameter of the cylindrical surface at which the bearing members engage each other.

It is also a feature of this invention to provide the inner yoke means with a gap substantially in radial alignment with each gap in the outer yoke means so as to avoid the appearance of leakage flux that would influence the portions of the tracking coils located proximate to the gaps, and to include one of the gaps of the inner yoke means in the means defining a path for the light beam.

It is further a feature of this invention to provide elastic positioning means for yieldably establishing a neutral position of the body member relative to the base member, and which is disposed in a gap of the inner yoke means so as to provide a compact arrangement of the lens assembly.

The above, and other objects, features and advantages of this invention, will be apparent from the following detailed description of illustrative embodiments thereof when read in conjunction with the accompanying drawings in which corresponding parts are identified by the same reference numerals

DETAILED DESCRIPTION OF THE PREFERRED EMBODIMENTS

Figure 3:
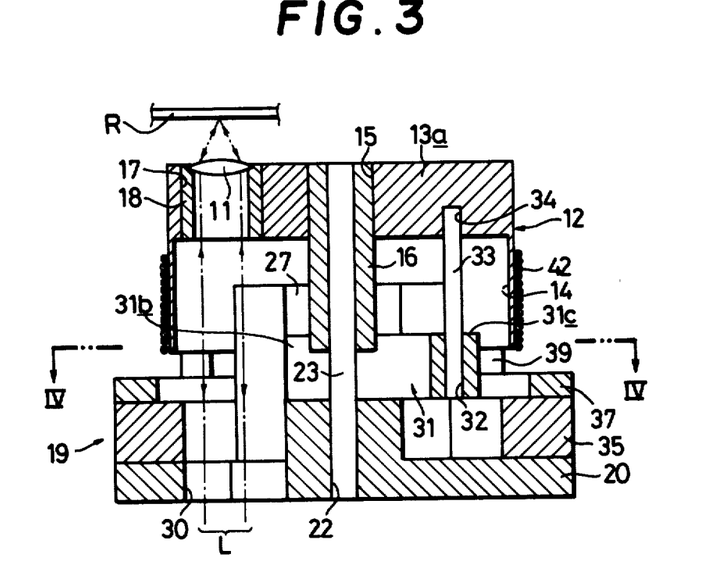
FIG. 3 is a vertical sectional view of the lens assembly of FIG. 2.

Referring initially to FIG. 3, it will be seen that, in an optical disc player or other apparatus having an optical lens assembly 10 according to an embodiment of this invention, a light beam L, desirably from a laser (not shown), is directed against a surface of a record medium R for optically reading information recorded in a track on such surface, and an objective lens 11 is interposed in the path of light beam L so as to have the central or optical axis of lens 11 generally parallel with the direction of the passage of the light beam therethrough.

The objective lens 11 is carried by a movable body member 12 having a substantially circular end wall 13 and a cylindrical side wall or barrel 14 depending from the periphery of end wall 13. End wall 13 is shown, particularly on FIGS. 1 and 2, to have a diametrically extending raised portion or rib 13a integral therewith and formed with a centrally located bore 15 extending vertically therethrough. A relatively small-diameter bearing sleeve 16, for example, of ceramic or a self-lubricating synthetic resin, such as, nylon, polyacetal or the like, has its upper end portion fixed in bore 15, as by a suitable adhesive, so that such bearing sleeve 16 is coaxial with the axis of cylindrical side wall 14. The body member 12 may be formed of aluminum, duralumin or another non-magnetic metal of low specific gravity. However, in order to avoid generation of eddy currents, it is preferable to use a non-metallic material, such as, a ceramic or a synthetic resin, at least for the cylindrical side wall 14 of movable body member 12.

The raised portion or rib 13a of end wall 13 is further formed with a bore 17 extending vertically therethrough and being eccentrically located, that is, having its axis substantially spaced radially from the central axis of side wall 14 and bearing sleeve 16. The objective lens 11 is secured in a mounting tube 18 which is, in turn, suitably fixed in bore 17 so that the optical axis of lens 11 is spaced by a substantial radial distance from the central axis of side wall 14 and bearing sleeve 16.

Figure 1:
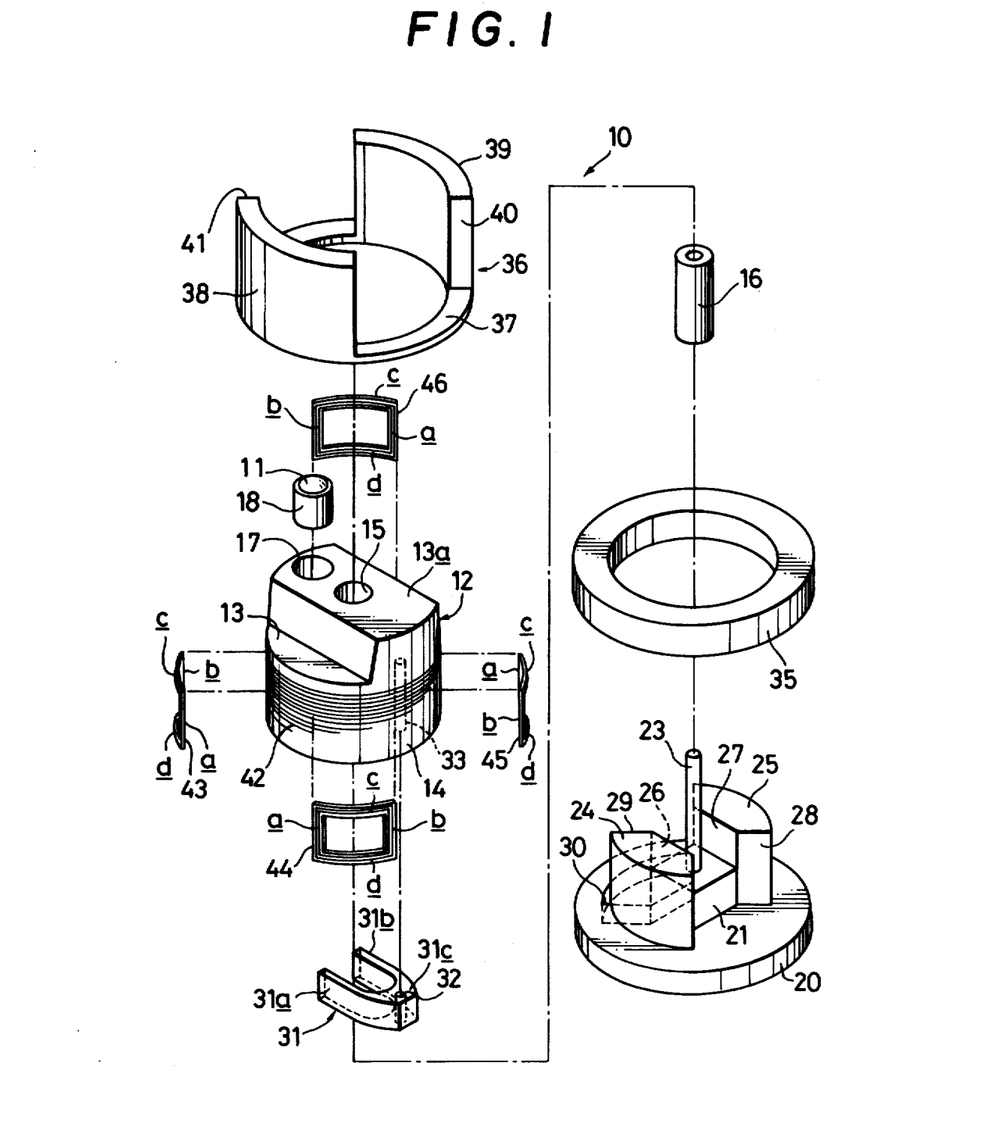
FIG. 1 is an exploded perspective view of an objective lens assembly according to an embodiment of the present invention.
Figure 2:
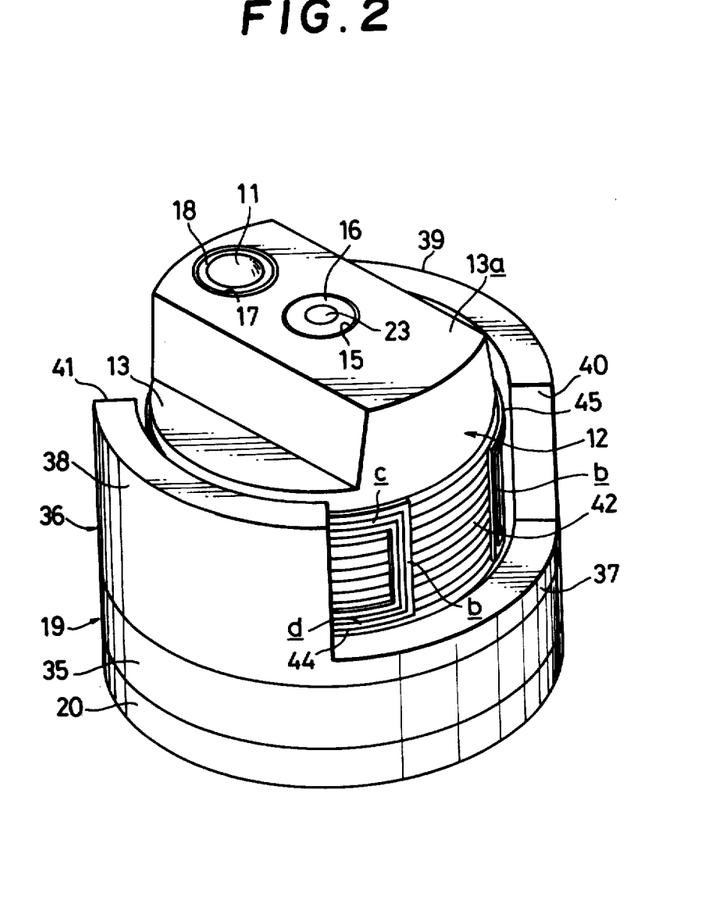
FIG. 2 is a perspective view of the objective lens assembly of FIG. 1 shown in its assembled condition.
Figure 4:
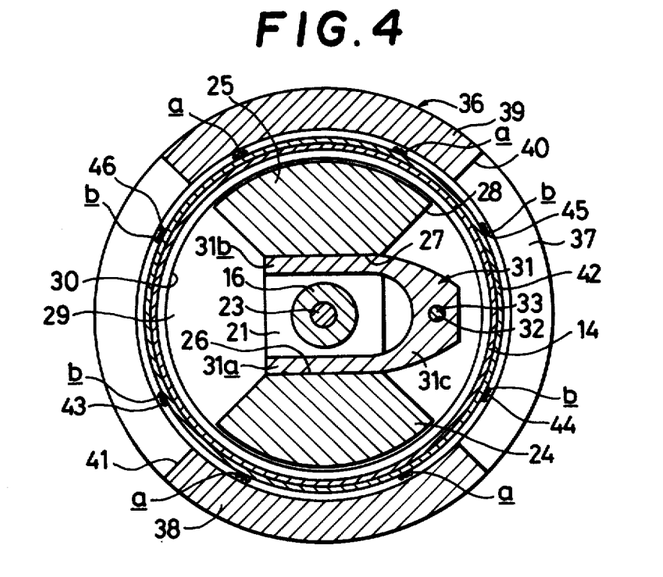
FIG. 4 is a horizontal sectional view taken along the line IV—IV on FIG. 3.

The objective lens assembly 10 embodying this invention is further shown to comprise a fixed member 19 comprised of a base 20 which is shown to be circular and formed, at its center, with a raised portion or cradle 21 (FIGS. 1, 3 and 4). A central bore 22 is formed vertically in cradle 21 of base 20, and the lower end portion of a metal shaft 23 of relatively small diameter is suitably fixed in bore 22 so that shaft 23 projects vertically from base 20. The projection shaft 23 is slidably received in the bore of bearing sleeve 16 so that movable body member 12 is thereby mounted above base 20 for rotary movements about the axis of shaft 23 and for axial or vertical movements relative to base 20.

A pair of inner yoke members 24 and 25 extend upwardly from base 20 at opposite sides of cradle 21 (FIGS. 1 and 4) and are formed of a magnetic material integrally with base 20 and cradle 21. The inner yoke members 24 and 25 extend above cradle 21 and are substantially of sector-shaped configuration. More particularly, yoke members 24 and 25 are shown to have arcuate outer surfaces constituting respective portions of a cylindrical surface, radially extending end surfaces which, for each of the inner yoke members 24 and 25, include an angle of about 90°, and spaced apart, confronting parallel inner surfaces 26 and 27, respectively, which extend above cradle 21. Thus, it will be seen that an inner yoke defined by yoke members 24 and 25 on base 20 has a pair of diametrically opposed gaps or cutouts 28 and 29 defined between the radially extending surfaces at the opposite adjacent ends of yoke members 24 and 25. Base 20 further has a sector-shaped aperture 30 extending therethrough and being substantially coextensive with the gap or cutout 29 between inner yoke members 24 and 25.

Side wall 14 of movable body member 12 is diametrically dimensioned so that, when bearing sleeve 16 is slidably disposed on shaft 23, inner yoke members 24 and 25 extend upwardly into body member 12 at the inside of side wall 14 with a relatively small clearance therebetween, as shown particularly on FIG. 4. Further, the radial distance from the optical axis of objective lens 11 in end wall 13 to the axis of shaft 23 is selected so that the path of light beam L, in travelling parallel to the axis of shaft 23 to and from objective lens 11, extends through movable body member 12 between bearing sleeve 16 and side wall 14, and also with substantial clearance through gap 29 in the inner yoke and aperture 30 in base 20.

In order to yieldably hold movable body member 12 in a neutral position both in respect to its rotary movements about shaft 23 and in respect to axial movements along such shaft, objective lens assembly 10 is shown to include an elastic positioning member 31 (FIGS. 1, 3 and 4) which is generally of U-shaped configuration so as to have spaced apart substantially parallel legs 31a and 31b adhered, as by an epoxy resin, to surfaces 26 and 27, respectively, immediately above cradle 21, and a curved connecting portion 31c extending beyond cradle 21 into gap 28 of the inner yoke. A vertical hole 32 is formed in connecting portion 31c to receive the lower end portion of a support pin 33 which, at its upper end, is received, for example, with a press-fit, in a downwardly opening vertical socket 34 formed in the raised portion or rib 13a of end wall 13 along a diametrical line which extends through the axis of bore 17. The elastic positioning member 31 is preferably formed of a high polymer resin, such as, polyurethane, and, during assembly of movable body member 12 on base 20, that is, when bearing sleeve 16 is being fitted downwardly over shaft 23, pin 33 has adhesive applied to its lower end portion to be fixed thereby in bore 32 of elastic positioning member 31.

The fixed member 19 of objective lens assembly 10 is further shown to include a ring-shaped magnet 35 which is suitably fixed on the upper surface of circular base 20 adjacent the outer periphery of the latter, and an outer yoke 36 of magnetic material which includes a ring 37 suitably fixed immediately on top of magnet 35, and diametrically opposed, arcuate outer yoke members 38 and 39 which extend upwardly from ring 37, and which each have an angular extent of approximately 90°. Magnet 35 and mounting ring 37 of outer yoke 36 are diametrically dimensioned so that outer yoke members 38 and 39 extend upwardly at the outside of cylindrical side wall 14 of movable body member 12 with a radial clearance therebetween, as particularly shown on FIG. 4. Further, mounting ring 37 is circumferentially positioned in respect to base 20 so that outer yoke members 38 and 39 are radially aligned with inner yoke members 24 and 25, respectively. Since outer yoke members 38 and 39 each have an angular extent of approximately 90° and are positioned so as to be diametrically opposed, outer yoke 36 has diametrically opposed gaps or cutouts 40 and 41 which are substantially aligned radially with gaps 28 and 29, respectively, of the inner yoke.

A focusing coil 42 is wound circumferentially about, and secured, as by a suitable adhesive, to the outer surface of side wall 14 of the movable body member 12 so as to be disposed in the clearance between side wall 14 and outer yoke members 38 and 39. Tracking coils 43, 44, 45 and 46, which are desirably of substantially rectangular configuration, as shown on FIG. 1, are also mounted on side wall 14, for example, by being adhesively secured to the surface of focusing coil 42. Each of the tracking coils 43-46 is shown on FIG. 1 to include first and second opposite side portions a and b extending parallel to the central axis of cylindrical side wall 14 and curved top and bottom portions c and d connecting the respective side portions a and b and extending circumferentially on side wall 14. The tracking coils 43-46 are spaced apart equally about the circumference of side wall 14 and arranged so that lines extending from the centers of coils 43-46 to the central axis of side wall 14 enclose angles of 45° in respect to the longitudinal medium of rib 13a on end wall 13. Tracking coils 43-46 are further connected with each other so that a tracking error signal applied to coils 43-46 will cause a driving current to flow in opposed directions through portions a and b, respectively, of the tracking coils. More specifically, tracking coils 43-46 are arranged, so that the portions a of coils 43 and 44, respectively, are positioned between inner and outer yoke members 24 and 38, and the portions a of tracking coils 45 and 46 are positioned between inner and outer yoke members 2 and 39. Furthermore, the portions b of tracking coils 4 and 45 are shown to be proximate or between the gaps 28 and 40 in the inner and outer yokes, respectively, while the portions b of tracking coils 43 and 46 are proximate or between gaps 29 and 41 of the inner and outer yokes.

It will be appreciated that inner yoke members 24 and 25 on base 20, magnet 35 and outer yoke 36 form a magnetic circuit for generating magnetic flux across the spaces between inner and outer yoke members 24 and 38 and between inner and outer yoke members 25 and 39, respectively, and hence through the cylindrical side wall 14 in such spaces. The focusing coil 42 is adapted to interact with such magnetic flux to constitute a linear motor by which movable body member 12 is displaced in the axial direction in response to the passage of a suitable driving current through coil 42, whereby to change or correct the focus of light beam L by lens 11. On the other hand, the portions a of tracking coils 43–46 are adapted to coact with the magnetic flux between yoke members 24 and 38 and between yoke members 25 and 39 to constitute a rotary motor for effecting rotational or angular displacements of body member 12 about the axis of shaft 23 in response to the supplying of a driving current to tracking coils 43–46. If the longitudinal medium of ridge 13a of end wall 13 is arranged generally tangential in respect to a track on record medium R which is being scanned, then rotation or angular displacements of body member 12 about the axis of shaft 23 will effect movements of lens 11 transversely in respect to the scanned record track, for example, for effecting tracking corrections.

It will be appreciated that, in the described objective lens assembly 10 according to an embodiment of this invention, the movements of body member 12 in the direction of the axis of shaft 23 for effecting focusing corrections, and the rotary or angular movements of body member 12 about the axis of shaft 23 for effecting tracking corrections, are yieldably resisted by elastic positioning member 31 which is effective to return body member 12 both axially and rotationally to its neutral position when driving currents are no longer supplied to focusing coil 42 and to tracking coils 43–46. Since elastic positioning member 31 is formed of a high polymer, such as polyurethane, it does not become resonant in response to movements of body member 12 by focusing and tracking error signals applied to coil 42 and to coils 43–46, respectively. Therefore, sensitivity of the described assembly 10 in correcting focusing and tracking errors is not degraded. Furthermore, since elastic positioning member 31 is housed within gap 28 between inner yoke members 24 and 25, such elastic positioning member 31 does not interfere with attainment of an objective lens assembly of compact size.

Since inner yoke members 24 and 25 are radially aligned with outer yoke members 38 and 39, respectively, gaps 28 and 29 in the inner yoke are radially aligned with gaps 40 and 41, respectively, in the outer yoke with the result that only an extremely small leakage flux, if and, acts on the portions b of the tracking coils 43–46 which are disposed in proximity to the gaps. Since the leakage flux is minimized, the density of the remaining magnet flux extending between yoke members 24 and 38 and between yoke members 25 and 39 and which coacts with the portions a of the tracking coils is substantially increased. Furthermore, the absence of any significant leakage flux for interacting with driving current flowing through portions b of tracking coils 43–46 serves to reduce to the minimum the torque that is generated in opposition to the desired torque resulting from the interaction of the driving current flowing through the portions a of the tracking coils with the magnetic flux between yoke members 24 and 38 and yoke members 25 and 39. Therefore, the effective or desired driving torque of the so-called rotary motor is increased. It will also be appreciated that, since the objective lens 11 is positioned between side wall 14 of body member 12 which carries the coils 42–46 and bearing sleeve 16 which mounts member 12 for movement on shaft 23, the eccentricity of lens 11 relative to the axis of shaft 23 can be increased to a maximum without increasing the diameter of the cylindrical surface at which bearing sleeve 16 engages shaft 23, and hence without increasing the frictional resistance to angular or rotary movements of body member 12. Therefore, tracking control can be performed with a minimum angle of rotation of body member 12 so as to improve the sensitivity of tracking correction.

Figure 5:
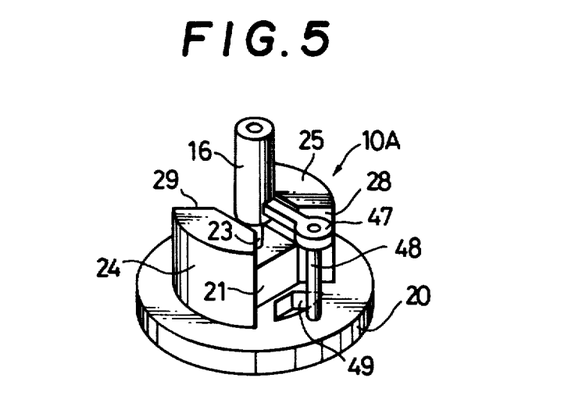
FIG. 5 is a fragmentary perspective view specifically illustrating an elastic positioning member in an objective lens assembly according to another embodiment of this invention which is otherwise similar to that of FIG. 1-4.

Referring now to FIG. 5, it will be seen that, in an objective lens assembly 10A according to another embodiment of the invention which is otherwise substantially similar to the previously described objective lens assembly 10, the elastic positioning member 31 is replaced by an elastic positioning member 47 in the form of an arm adhesively secured, at one end, to the lower end portion of bearing sleeve 16 and extending radially outward from the latter in gap 28 of the inner yoke. The outer end portion of elastic arm 47 is adhesively secured to the upper end portion of a pin 48 extending upwardly from the upper surface of base 20 to which pin 48 is suitably fixed. An aperture 49 is formed through base 20 adjacent pin 48 so that, upon assembly of the bearing sleeve 16 of movable body member 12 (not shown on FIG. 5) on shaft 23, a jig can be inserted through aperture 49 for accurately positioning elastic arm 47 relative to bearing sleeve 16 at the time when the adhesive connection therebetween in effected. Aperture 49 further permits inspection therethrough of elastic positioning arm 47 for determining its condition and the security of its connection to bearing sleeve 16 and pin 48.

Figure 6:
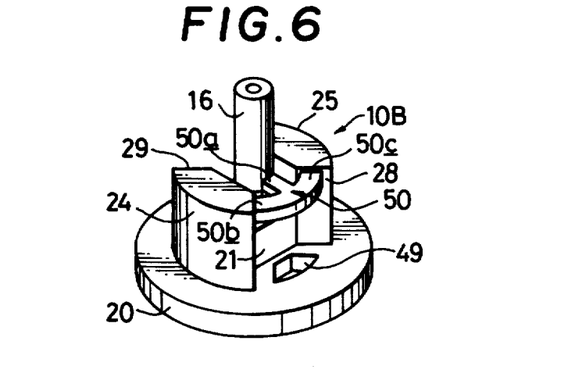
FIG. 6 is a fragmentary perspective view similar to that of FIG. 5, but showing still another embodiment of this invention.

Referring now to FIG. 6, it will be seen that, in an objective lens assembly 10B in accordance with another embodiment of this invention which is otherwise similar to assembly 10, an elastic positioning member 50 is provided with a substantially T-shaped configuration. Positioning member 50 is shown to have a stem portion 50a adhesively secured, at its end, to the lower end portion of hearing sleeve 16 and extending radially therefrom, and a head or cap portion extending across the gap 28 between inner yoke members 24 and 25, with ends 50b and 50c of such head portion being adhesively secured to the angled end surfaces of yoke members 24 and 25 which define the limits of gap 28. In this embodiment, base 20 again has an aperture 49 through which a suitable Jig can be inserted for positioning member 50 when the latter is being adhesively secured to bearing sleeve 16 and to yoke members 24 and 25.

Figure 7:
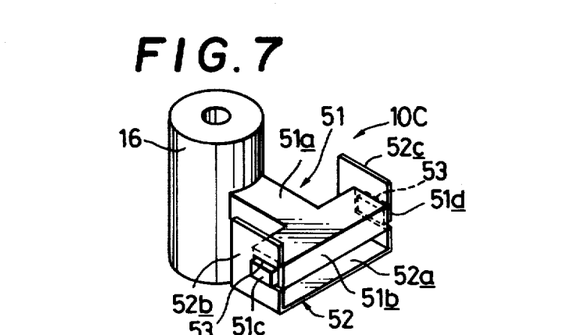
FIG. 7 is a fragmentary perspective view specifically illustrating an elastic positioning member in accordance with still another embodiment of the invention.

Referring now to FIG. 7, it will be seen that, in an objective lens assembly 10C according to still another embodiment of this invention which is otherwise similar to the assembly 10 described above with reference to FIGS. 1–4, the elastic positioning member 31 and pin 33 of assembly 10 are replaced by an elastic positioning member 51 of T-shaped configuration secured to bearing sleeve 16 and a bracket 52 secured to base 20 (not shown) and adapted to automatically engage positioning member 51 in response to assembling of the movable body member 12 (not shown) on the base. More particularly, T-shaped elastic positioning member 51 is shown to have the end of its stem portion 51a adhesively secured to bearing sleeve 16 so that such stem portion 51a extends radially from bearing sleeve 16 within gap 28 of the inner yoke. The head portion 51b of the T-shaped member 51 has reduced or stepped-down ends 51c and 51d, and bracket 52 is of U-shaped configuration so as to have a base portion 52a suitably fixed on base 20 and upwardly directed side portions 52b and 52c formed with cutouts 53, respectively. The cutouts 53 are dimensioned to closely receive the step-down ends 51c and 51d of positioning member 51, and the distance between side portions 51b and 51c of bracket 52 is made slightly less than the non-stressed distance between the faces of ends 51c and 51d. Thus, when bearing sleeve 16 is being slidably moved downwardly on shaft 23 during assembly of movable body member 12 on base 20, ends 51c and 51d of head portion 51b are initially squeezed toward each other to fit between side portions 52b and 52c of bracket 52. As the downward movement of body member 12 continues, step-down ends 51c and 51d of elastic positioning member 51 snap into the respective cutouts 53 of bracket 52, thereby to establish the neutral position of body member 12 relative to base 20. Thus, it will be seen that assembling of the embodiment of the invention shown on FIG. 7 is easily effective and there is no need to provide an aperture, as at 49 on FIGS. 5 and 6, for the insertion of an assembling jig.

Although the cylindrical side wall 14 of movable body member 12 has been described and shown as being formed apart from the coils 42–46 which are thereafter adhesively secured on side wall 14, other arrangements may be employed for forming and supporting such coils 42–46. For example, conductive patterns corresponding to focusing coil 42 and tracking coils 43–46 may be printed on a flexible substrate. Thereafter, the printed substrate is arcuately bent or rolled into a cylindrical form for constituting the cylindrical side wall 14 which is suitably secured to the periphery of end wall 13, and already has coils 42–46 thereon. Thus, the manufacture of the coils on the movable body member 12 is substantially facilitated. Alternatively, it is possible to use edgewise or flattened wires to form bobbin-less air-core coils in which successive turns of flattened wire are simply superposed on each other at their relatively flat surfaces. If tracking coils 43–46 are thus formed of flattened wire, the space factor thereof, that is, the ratio of the cross-sectional area of metal to the overall cross-sectional area of the coil, is increased with the result that sensitivity of tracking correction is improved.

By way of summary, it is to be noted that, in an objective lens assembly according to this invention, the objective lens 11 has its optical axis spaced substantially in the radial direction from the axis of the shaft 23 on which the movable body member 12 is supported, the inner and outer yokes respectively disposed inside and outside the cylindrical wall 14 of body member 12 have gaps 28 and 29 aligned with gaps 40 and 41, respectively, the focusing coil 42 and the portions a of the tracking coils 43–46 through which a driving current flows in one direction are located between the inner and outer yoke members 24 and 38 and the inner and outer yoke members 25 and 39, and the portions b of the tracking coils 43–46 through which the driving current flows in the opposite direction are located proximate to the gaps 28 and 29 of the inner yoke and the gaps 40 and 41 of the outer yoke. By reason of the foregoing, in the objective lens assembly according to the invention, the eccentricity of the lens 11 relative to the axis of shaft 23 about which body member 12 is turnable and the driving moments or torque acting on body member 12 for turning the latter may be increased for improving the sensitivity with which tracking errors are corrected.

Furthermore, since bearing sleeve 16 and preferably also shaft 23 on which sleeve 16 is slidable for moving supporting body member 12 are formed of non-magnetic materials, magnetization thereof by magnet 35 is prevented so that highly reliable tracking corrections can be effected over an extended period of time without degradation of the tracking servo characteristic.

Having described specific embodiments of the present invention, it is to be understood that the invention is not limited to those precise embodiments, and that various changes and modifications may be effected therein by one skilled in the art without departing from the scope or spirit of the invention as defined in the appended claims.

What is claimed is:

1. A lens assembly comprising:
   a body member having a substantially circular end wall and a cylindrical side wall depending from the periphery of said end wall;
   support means including a base member disposed under said body member and cooperatively engageable bearing members extending from said end wall and from said base member, respectively substantially close to the central axis of said cylindrical side wall and being relatively movable to permit at least rotary movements of said body member relative to said base member about said central axis;
   a lens mounted eccentrically in said end wall radially between said side wall and said bearing members with an optical axis of said lens extending parallel with said central axis;
   inner and outer yoke means extending upwardly from said base member at the inside and outside, respectively, of said cylindrical side wall with radial clearance therebetween, said inner and outer yoke means having respective gaps therein which are radially aligned with each other;
   magnet means associated with said yoke means for generating magnetic flux through said cylindrical side wall of the body member between said inner and outer yoke means;
   coil means on said cylindrical side wall of the body member and shaped to have first and second portions extending substantially parallel to said central axis and through which a driving current supplied to said coil means will flow in opposed directions, each of said first portions of the coil means being located between said inner and outer yoke means for interacting with said magnetic flux and thereby effecting said rotary movements in response to said driving current, each said second portion of the coil means being located proximate to said radially aligned gaps to be substantially free of said magnetic flux;
   means defining a path through said inner yoke means for a light beam directed substantially along said optical axis of the lens and passing between said bearing members and said side wall; and
   elastic positioning means for yieldably establishing a neutral position of said body member relative to said base member.

2. A lens assembly according to claim 1; in which said gap in the inner yoke means is included in said means defining a path for the light beam.

3. A lens assembly according to claim 2; in which said means defining a path for the light beam further includes an opening through said base member aligned with said gap in the inner yoke means.

4. A lens assembly according to claim 1; in which said bearing members are relatively movable to also permit axial movements of said body member relative to said base member in the direction of said central axis; and further comprising additional coil means extending circumferentially on said cylindrical side wall between said inner and outer yoke means for interacting with said magnetic flux and thereby effecting said axial movements in response to the supplying of an additional driving current to said additional coil means.

5. A lens assembly according to claim 1; in which each of said inner and outer yoke means has a second gap therein which is diammetrically opposed to the first mentioned gap in the respective yoke means.

6. A lens assembly according to claim 5; in which said elastic positioning means is disposed in said second gap of said inner yoke means.

7. A lens assembly according to claim 6; in which said base member has an aperture therethrough communicating with said second gap in the inner yoke means for providing access to said elastic positioning means.

8. A lens assembly according to claim 5; in which the first mentioned coil means includes four substantially rectangular coils each having said first and second portions at opposed sides thereof and connected by curved top and bottom portions, said four rectangular coils are arranged on said cylindrical side wall with said curved top and bottom portions extending circumferentially and with their centers spaced apart by 90°, two of said rectangular coils having said second portions thereof adjacent each other and located proximate to the first mentioned gaps of said inner and outer yoke means, and the other two of said rectangular coils having their respective second portions adjacent each other and located proximate said second gaps of said inner and outer yoke means.

9. A lens assembly according to claim 6; in which said bearing members include a central shaft extending upwardly from said base member, and a bearing sleeve extending downwardly from the center of said end wall and being slidable on said shaft.

10. A lens assembly according to claim 9; in which said inner yoke means has a central channel extending between said first and second gaps thereof and defining opposed faces at opposite sides of said channel; and said elastic positioning means includes a generally U-shaped elastic member having legs adhered to said opposed faces and a connecting portion extending into said second gap, and a pin extending upwardly from said connecting portion of the elastic member parallel with said central axis, said end wall of the body member having a bore spaced radially from said central axis and receiving the upper end of said pin.

11. A lens assembly according to claim 9; in which said elastic positioning means includes an elastic element extending radially from said bearing sleeve into said second gap of the inner yoke means, and a pin depending from the radially outer end portion of said elastic element and secured at its lower end to said base member.

12. A lens assembly according to claim 9; in which said elastic positioning means includes a generally T-shaped member having a stem portion extending radially outward from said bearing sleeve into said second gap of the inner yoke means, and a head portion extending across said stem portion and having ends secured to end faces of said inner yoke means at opposite sides of said second gap in the latter.

13. A lens assembly according to claim 9; in which said elastic positioning means includes a generally T-shaped member having a stem portion extending radially outwardly from said bearing sleeve into said second gap of the inner yoke means and a head portion extending across said stem portion, and a bracket secured on said base member within said second gap and having spaced apart side members with cutouts therein receiving opposite ends of said head portion for securing the latter to said base member.

* * * * *